March 5, 1968   TADASHI MISE ET AL   3,371,492

FOUNDATION UTILIZING OSMOTIC PRESSURE

Filed Aug. 31, 1965

TADASHI MISE AND
TAKEO SUZUKI
INVENTORS

BY Wendroth
Lind and Ponack, attorneys

United States Patent Office 3,371,492
Patented Mar. 5, 1968

3,371,492
FOUNDATION UTILIZING OSMOTIC PRESSURE
Tadashi Mise, 1, 1-chome Yatabecho-Nakadori, Yata, Higashisumiyoshi-ku, and Takeo Suzuki, 283–9 Kido-cho, Kawachinagano-shi, both of Osaka, Japan
Filed Aug. 31, 1965, Ser. No. 484,001
Claims priority, application Japan, Sept. 5, 1964, 39/50,931; Mar. 2, 1965, 40/12,003; Mar. 15, 1965, 40/15,178
7 Claims. (Cl. 61—10)

ABSTRACT OF THE DISCLOSURE

Method and apparatus for soil stabilization comprising inserting a drain chamber into water containing soft clay ground. Water in soil is drained from the soft clay ground through a semi-permeable membrane forming part of the drain chamber into the interior of the drain chamber due to the effect of the difference of osmotic pressure across the membrane. The drain chamber comprises a semi-permeable membrane surrounding a supporter, and has an aqueous solution of a water soluble solute in the interior of the chamber.

---

Figure 1:
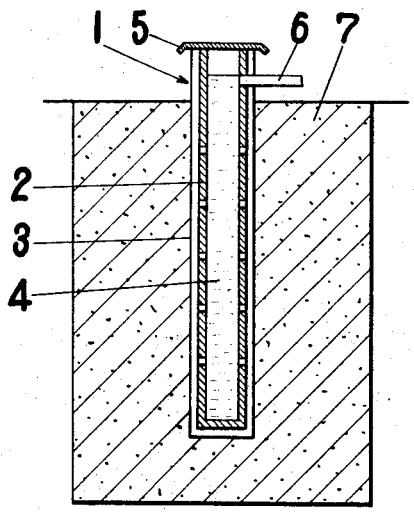

This invention relates to a method and an apparatus for soil stabilization utilizing the phenomenon of osmotic pressure, and more particularly to a method for soil stabilization using a semi-permeable membrane which comprises draining off water from soft clay ground by percolating water through the semi-permeable membrane of a drain chamber by the effect of osmotic pressure difference across the membrane into the drain chamber. The drain chamber is inserted into soft clay ground and contains an aqueous solution of a water soluble solute. The drained water is removed from the drain chamber to effect stabilization of the ground.

Recently, reclamation of seaside or lake shore is desirable in many districts, but much of such ground is very soft clay ground which is composed of mud of 110–140% water; it is often called an "extra-soft clay stratum."

There are also many areas of soft clay ground in the world, especially in Southeast Asia, and it is very desirable to stabilize such "extra-soft clay stratum." Unfortunately, no effective method for that purpose is known. Methods for the stabilization of soft ground known heretofore are the "sand drain method," "paper drain method" and "capillary drain method." In the "sand drain method" and "paper drain method," however, a soil load placed on the ground is necessary to drain off the water, and so they are difficult to apply to very soft ground because it is next to impossible to convey a load of soil onto such ground. The "capillary drain method" of draining water from a volume of soft ground more than several meters in depth through capillary action is not always easy and long periods are required for the stabilization of the ground. Therefore, the efficiency of the method is so low that this method is not practical. Thus, there is no effective method for the rapid stabilization of such extra-soft and weak ground, the only practical method being a method of natural drying by evaporation of water from the surface of the ground.

The inventors have searched for the solution to the above problem for a long time, and have now found out that stabilization of soft clay ground can be carried out easily and effectively by inserting a drain chamber, which comprises a semi-permeable membrane surrounding a supporter and containing an aqueous solution of a water soluble solute, into the above soft ground, and draining off water in the ground through the semi-permeable membrane. This method of soil stabilization utilizing the phenomenon of osmotic pressure is very useful in industrial practice.

An object of this invention is to provide a method for draining water from soft clay ground by removal of water contained in soil into a drain chamber through a semi-permeable membrane by utilizing the phenomenon of osmotic pressure.

It is another object of this invention to drain and stabilize the soft clay ground by removing water in the pores of the soil through a semi-permeable membrane by means of osmotic pressure into a drain chamber with a sand pile therein constructed in the soft clay ground.

It is a further object of this invention to provide an apparatus with which water is drained from soft clay ground into a drain chamber through a semi-permeable membrane by osmotic pressure.

Figure 2:
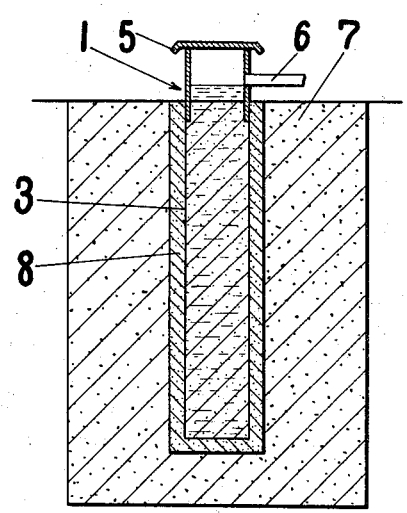
Figure 3:
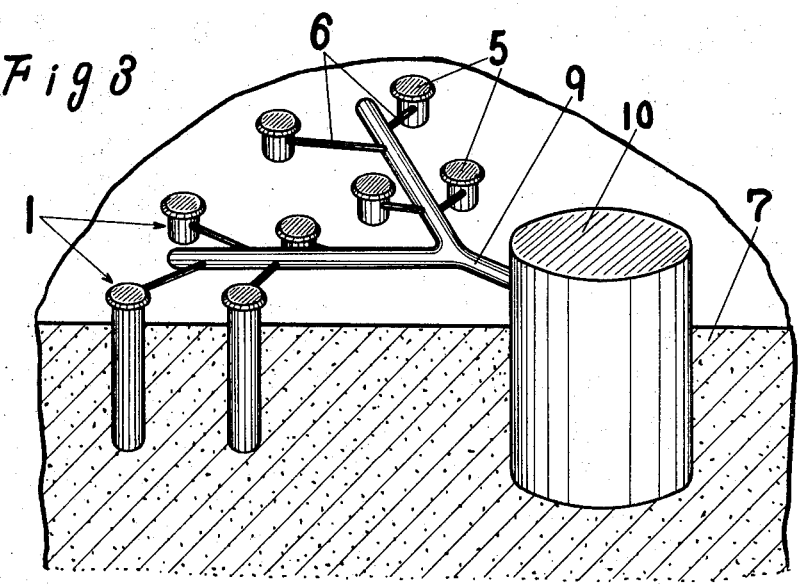

Other objects and advantages of this invention will become apparent from the following description taken together with the accompanying drawings, in which:

FIGURE 1 is a sectional view of a drain chamber according to this invention set into ground;
FIGURE 2 is a sectional view of another drain chamber according to this invention set into ground; and
FIGURE 3 is a perspective sectional view of a volume of soft clay ground wherein several drain chambers for the draining of water and a collection pipe system for the removal of drained water from the drain chambers to a tank are shown.

In this invention, the following steps are used for draining water from the soft clay ground. First of all the drain chamber is inserted into the soft clay ground, the said chamber comprising a supporter, a semi-permeable membrane, and an aqueous solution of water soluble solute in the chamber, as more fully described hereinafter. The water which is drained into the drain chamber through the semi-permeable membrane flows out of the top of the chamber and is carried off.

When the chamber is set into the soft clay ground, removal of water in the pores of the soft clay ground occurs and water is drained into drain chamber owing to the difference of osmotic pressure between the aqueous solution of the water soluble solute in the chamber and the water in the soft clay soil which may also contain a solute, the difference corresponding to the difference of concentration of these two solutions, and the water in soil is drained into the drain chamber through the semi-permeable membrane, until the pressure on both sides of the semi-permeable membrane is made equal by the dilution of solute in the chamber. Water flow will stop when the concentration of two solutions becomes practically equal. But water can be continuously drained if solute is added continuously or intermittently to the chamber to keep the concentration of the solution in the chamber higher than that of the water in the soft clay ground. This invention is based on this principle and the water flowing from the top of the drain chamber is led by a pipe to a collection point or the water is left where it flows over the top and is dried by evaporation, because the drained water is no longer absorbed into the soft clay ground.

In such procedure the water contained in soil is drained day by day and the soft clay ground is consolidated firmly so that it will support a heavy load.

The supporter for the drain chamber is, generally, a box-shaped vessel made of metal or synthetic resin, or a cylinder made of metal or synthetic resin, and liquid can pass freely through small or large holes in it. However, the supporter is not restricted to such shapes and can be any other material such as, for example, porous material, textile material or a sand pile.

As the semi-permeable membrane there can be used any material which is semi-permeable and has sufficient mechanical strength, such as collodion film, membrane made from animal tissue, cloth impregnated with gelatin, cardboard, rubber film, cellophane, sulphate paper, water-resistant polyvinyl alcohol film, polyethylene film, cellulose acetate film or the other natural or synthetic film or sheet. Of these materials, water-resistant polyvinyl alcohol film is preferred because of the mechanical strength of the film, its resistance to the action of micro-organisms in the soil, and the rate of permeability of water. Water-resistant polyvinyl alcohol film is easily obtained by a known procedure such as, e.g., by use of completely hydrolyzed polyvinyl alcohol film, by heat treatment thereof, by acetalization thereof with various aldehydes or by insolubilization with bichromate or titanium compounds.

In the process of this invention, the semi-permeable membrane of the drain chamber to be inserted into ground can be treated by the following procedures in order to give additional mechanical strength to the membrane:

(I) lamination of two sheets of semi-permeable membrane to each other, (II) lamination of semi-permeable membrane to cloth, (III) wrapping paper or cloth around the column of the membrane or netting with metal or synthetic resin on the outer side of the membrane.

The solute to be charged into the chamber can be a water soluble substance such as sodium chloride, sugar, aluminum sulphate, water glass, polyvinyl alcohol and lignin, etc., and the resulting solution has a higher osmotic pressure than that of water in the soil.

The details of this invention are further illustrated in the figures. However, the figures are only examples of the apparatus used in this method and they are not to be considered as limiting the process. It is possible to change the details of the embodiments of this invention, if desired.

In FIGURE 1, the drain chamber shown has a water-resistant polyvinyl alcohol film 3 which is a semi-permeable membrane. A supporting column 2 acts as a supporter for semi-permeable membrane 3 and the column has a lot of small or large holes 11. A solution 4 of high solute concentration as compared to the water in the soil 7 fills the interior of the supporter 2. The chamber 1 has a cover plate 5 for protection against the inflow of rain and has an overflow drainpipe 6. When metallic pipe or synthetic resin pipe is used as the supporting column 2, for higher effectiveness of semi-permeable membrane, it is better to leave a small clearance between the film and the column. The chamber 1 is set into the ground 7 with the upper section of the chamber projecting above the ground level.

Inserting of the chamber into soft ground is easily carried out due to the softness of the ground and the chamber can also be set into harder ground by preliminary boring of a suitable hole. When the chamber 1 is set into the ground 7, water in the ground percolates through the water-resistant polyvinyl alcohol film into the chamber 1 by osmotic pressure. Then the solution in the chamber 1 rises and flows out from the top of the chamber via drainpipe 6. With this arrangement, ground of 110–140% initial water content can be drained to 80–90% water content after 1–2 weeks' treatment.

In practice, a large area of soft clay ground can be stabilized in a very short period of time by using sets of the chambers each spaced from the other at 0.5–2 m. and extending to a depth of from 4–8 m. As shown in FIGURE 3, several apparatuses are used and the drainpipe 6 is connected to a collecting pipe 9. The collecting pipe 9 is connected to a tank 10, so that the overflow aqueous solution flows into the tank. A vacuum pump can also be used to draw the solution through the collection pipe. After the decrease of water content from 110–140% to 80–90%, draining of water can be further continued by pumping, and the other known process can also be applied, because the ground is fairly well stabilized so that heavier loads can be moved over it.

The solution 4 in the chamber 1 has a higher osmotic pressure than the water in the soil. However, the solution is diluted by water which penetrates the semi-permeable membrane. If necessary, it is better to use a saturated solution wherein some precipitate is present at the bottom of the chamber can be used.

As mentioned above, this method is very effective for the stabilization of extra-soft clay ground and is also applicable to ordinary soft clay ground.

The "sand drain method" can be used in connection with the above described apparatus in order to increase the effect of draining of the water according to this invention. The "sand drain method" has a grave fault, as described above, that some kind of load is necessary to effect the draining of the water. On the other hand, this method has the advantage in the draining of water that the hydrostatic pressure difference between sand pile and soft clay ground accelerates the effect of draining the water.

In carrying out the present invention, the above mentioned advantage of the sand drain method can be utilized. A sand pile 8 is used as a supporter for the semi-permeable membrane as shown in FIGURE 2. In a practical embodiment of this method, there are two ways of proceeding, as follows. In the first, the sand pile 8 is covered with the semi-permeable membrane 3 and the resultant apparatus is inserted into the soft clay ground; in the second, a steel pipe having a bottom which can be freely opened and shut is inserted into the soft clay ground, and then sand is charged into the pipe to form a sand pile. Only the pipe is pulled out after the bottom is opened, and then a permeable membrane filled with a solute containing liquid is further inserted into the sand pile.

The following examples will further illustrate this invention, but the invention is not to be restricted to these examples.

*Test example*

Sample clay was charged into a cylindrical vessel having a diameter of 15 cm. and a depth of 15 cm. The clay had a liquid limit of 50% and natural water content of 110%. Into the middle of the vessel was inserted a cellophane cylinder 5 cm. in diameter and 6 cm. in depth to serve as a drain chamber, and then sea water was poured into the drain chamber. After 2 days, the clay around the drain chamber had two deep radial cracks at an angle of 180° to each other. These cracks were considered to be due to the dehydration of clay. When 110 cc. of a 20% salt solution was used instead of sea water, three deep radial cracks occurred at an angle of 120° to each other. When water was used in place of the sea water or salt solution, no cracks occurred in the clay ground.

*Example 1*

Using the apparatus as shown in FIGURE 1, a soil stabilization test was carried out under the following conditions on extra-soft clay stratum in reclaimed land at the seashore along Osaka Bay, Japan. The clay stratum had about 140% of natural water content.

*Semi-permeable membranes.*—Water-resistant polyvinyl alcohol having a degree of polymerisation of 1700 and a degree of hydrolysis of 99.6 mol percent and heat-treated at 160° C. for 20 seconds.

*Supporter.*—Iron pipe 10 cm. in diameter and 1 m. in length; the upper end of the pipe was open and the end of the pipe was closed. Small holes 7 mm. in diameter were bored at intervals of 3 cm. in the side surface of the iron pipe.

*Solution.*—7 liters of saturated sugar solution.

Ten drain chambers thus constructed were inserted into the ground with their upper ends 10 cm. above the surface of the ground and at intervals of 0.5 m. from each other. After two weeks, the soft ground was stabilized and a man could walk on the ground. The water content of the clay stratum was 90%. In the course of this test, sugar solution was added to the drain chamber at intervals as necessary to maintain the concentration. The polyvinyl alcohol film was not broken down during continuous use in the test period of three months.

*Example 2*

The experiment was carried out in the same manner as in Example 1 except the semi-permeable membrane of water-resistant polyvinyl alcohol film was changed to a cellophane membrane. After three weeks, the water content in the ground decreased to 90%.

*Example 3*

The experiment was carried out in the same way as in Example 1 using sulphate paper as the semi-permeable membrane. After four weeks, the water content in the ground decreased to 90%.

*Example 4*

The experiment was carried out in the same way as in Example 1 except that a film of polyvinyl formal resin was used, the formal resin having a degree of polymerisation of 1700 and a degree of hydrolysis of 99.6 mol percent. After three weeks, the water content in the ground decreased to 85%.

*Example 5*

The experiment was carried out in the same way as in Example 1 except that a heat-treated film of polyvinyl alcohol was used as a semi-permeable membrane and saturated sodium chloride solution with 20% excess of precipitates in the undissolved state was used. Said film had a degree of polymerisation of 1700 and a degree of hydrolysis of 99.9 mol percent and was 0.03 mm. thick. After three weeks, the water content in the ground decreased to 100% and a man could walk on the stabilized ground.

*Example 6*

A sand pile 20 cm. in diameter and 5 m. in length was inserted into soft clay ground in the reclaimed land at the seashore along Osaka Bay, Japan. The soft clay stratum had 110% natural water content.

The sand pile was made by inserting a steel pipe into the soft clay ground, filling the steel pipe with sand and pulling the pipe out.

A drain chamber was inserted into the sand pile which served as a supporter. The drain chamber was a sack of polyvinyl alcohol film and lignin liquor in the sack of film. The sack was 10 cm. in diameter and 4 m. in length. The drain chamber was placed in the middle of the above-mentioned sand pile in the soft clay ground.

After four weeks, the water content of the soft clay ground decreased to 90% in an area over 2 m. distance from the drain chamber and 3 m. in depth, and a man could walk on the ground.

What we claim is:

1. A method of stabilizing a high water content soil, comprising inserting at least 1 drain chamber into the soil, the drain chamber having a supported semi-permeable membrane and a space within the membrane containing an aqueous solution of a water soluble solute in a concentration higher than the concentration of solutes in the water in the soil, collecting water from the soil in said drain chamber which percolates through the membrane due to the difference in osmotic pressure across the membrane, and removing the liquid from the interior of the drain chamber, whereby water is removed from the soil and the soil is stabilized.

2. The method as claimed in claim 1 in which the solute is added to the aqueous solution in the drain chamber at intervals during the method to maintain the concentration of solute in the drain chamber.

3. The method as claimed in claim 1 wherein the semi-permeable membrane is a film selected from the group consisting of collodion film, membrane from animal tissue, cloth impregnated with gelatin, cardboard, rubber film, cellophane, sulphate paper, water-resistant polyvinyl alcohol film, polyethylene film and cellulose acetate film.

4. The method as claimed in claim 1 wherein the solute is a water soluble solute selected from the group consisting of sodium chloride, sugar, aluminum sulphate, water glass, polyvinyl alcohol and lignin.

5. The method as claimed in claim 1 wherein a plurality of drain chambers are inserted into the soft clay ground at distances of 0.5–2 m. from each other and to a depth of 4–8 m.

6. A method of stabilizing a high water content soil, comprising inserting a rigid pipe into the soil, forming a sand pile in said pipe, pulling the pipe out from around the sand pile, inserting a drain chamber into the sand pile, the drain chamber having a semi-permeable membrane surrounding a space within the membrane and containing an aqueous solution of a water soluble solute in a concentration higher than the concentration of solutes in the water in the soil, collecting water from the soil in the drain chamber which percolates through the membrane due to the osmotic pressure across the membrane, and removing the liquid from the interior of the drain chamber, whereby the water is removed from the soil and the soil is stabilized.

7. A drain chamber for use in carrying out a soil stabilization method, said drain chamber comprising a supporter enclosing a space, said supporter having a plurality of apertures therein, a drainpipe extending laterally from the upper end of said supporter, and a semi-permeable membrane surrounding the supporter and supported against the outer wall of the supporter, whereby an aqueous solution of a water soluble solute can be placed in the interior of the supporter and the drain chamber can be inserted into a high watter content soil in which the water has a lower content of solutes when the aqueous solution within the drain chamber, and the water will be drawn out of the soil by osmotic pressure.

References Cited

UNITED STATES PATENTS

| | | | |
|---|---|---|---|
| 1,570,697 | 1/1926 | Moore | 61—36 X |
| 1,760,314 | 5/1930 | Murrey | 61—11 |
| 2,530,223 | 11/1950 | Breaux | 166—228 |
| 3,204,414 | 9/1965 | Steverman | 61—36 |
| 3,270,817 | 9/1966 | Papaila | 166—227 |
| 3,099,318 | 7/1963 | Miller | 166—227 |

FOREIGN PATENTS

| | | |
|---|---|---|
| 332,951 | 2/1921 | Germany. |
| 432,253 | 7/1935 | Great Britain. |
| 399,676 | 11/1942 | Italy. |

OTHER REFERENCES

Office of Saline Water Research and Development Progress Report No. 16, U.S. Dept. of the Interior "Water and Ion Flow Through Imperfect Osmotic Membranes," April 1957 (pp. 3 to 16).

JACOB SHAPIRO, *Primary Examiner.*